United States Patent [19]

Lucas et al.

[11] Patent Number: 5,681,874
[45] Date of Patent: Oct. 28, 1997

[54] TIRE HAVING SILICA REINFORCED TREAD

[75] Inventors: Danielle Lucas, Welsdorf, Luxembourg; Ghislain Adolphe Leon Thise, Wardin, Belgium

[73] Assignee: The Goodyear Tire & Rubber Company, Akron, Ohio

[21] Appl. No.: 644,642

[22] Filed: May 4, 1996

[51] Int. Cl.$^6$ ..................................................... C08K 9/06

[52] U.S. Cl. .................. 523/212; 524/570; 524/575.5; 524/496; 524/493; 524/847; 524/866; 524/332.6; 152/209 K

[58] Field of Search .......................... 523/212; 524/570, 524/575.5, 496, 493, 847, 866; 525/332.6; 152/209 R

[56] References Cited

U.S. PATENT DOCUMENTS 5,336,730   8/1994   Sandstrom et al. ................... 525/332.6

*Primary Examiner*—Karen A. Dean
*Attorney, Agent, or Firm*—Henry C. Young, Jr.

[57] ABSTRACT

The invention relates to a tire with a tread. The tread is composed of three basic elastomers, namely, medium cis 1,4-polybutadiene rubber, isoprene/butadiene copolymer and natural cis 1,4-polyisoprene rubber and which is reinforced with either carbon black or a combination of carbon black and silica reinforcing fillers.

33 Claims, No Drawings

5,681,874

1

TIRE HAVING SILICA REINFORCED TREAD

FIELD

This invention relates to a tire having a rubber tread which is composed of three basis elastomers, namely, medium cis 1,4-polybutadiene rubber, isoprene/butadiene rubber and natural cis 1,4-polyisoprene. The tread rubber is reinforced with either carbon black or a combination of silica and carbon black reinforcing fillers, together with a coupling agent for the silica.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, traction, rolling resistance, and wear.

Typically, the tread rubber is reinforced with carbon black or a combination of carbon black and silica fillers. Often, the silica is used with a silica coupler to couple the silica to the elastomers for rubber reinforcement purposes. Such use of carbon black and silica, including use of silica couplers, is well known to those having skill in such art.

The term "phr" as used herein, and according to conventional practice, refers to "parts of a respective material per 100 parts by weight of rubber".

The terms such as "compounded rubber", "rubber compound" and "rubber composition" relate generally to "rubber which has been mixed with various rubber compounding ingredients". Such terms are well known to those skilled in the rubber mixing art, especially for tires.

The terms "vulcanized", "vulcanize", "cured" and "cure", if used herein, are used interchangeably to refer to the "vulcanization of rubber" and such terms are well known to those having a skill in the rubber vulcanization art.

The term "Tg" as used herein refers to the "glass transition temperature of a particular elastomer". Glass transition temperatures are well known characterizations of elastomers. They may, for example, be suitably determined by a DSC instrument with a heating rate of 20° C. per minute.

Those having skill in the art of providing tires with tread compositions which may be suitable for use in many cases in both summer and winter, sometimes referred to as "all-season tires", are aware that a satisfactory combination of tire tread properties can often be achieved by use of a blend of elastomers with different glass transition temperatures (Tg's). For example, styrene/butadiene copolymer rubbers having a Tg in a range of about −35° to about −50° C. might be blended with natural rubber having a Tg of about −60° to about −65° C. and/or cis 1,4-polybutadiene rubber having a Tg of about −85° to about −105° C. to obtain tire tread compositions with acceptable traction on wet road surfaces and on icy road surfaces.

Replacing a relatively high Tg styrene/butadiene copolymer rubber with another rubber of similar Tg would be expected to provide a tire tread of similar traction on wet road surfaces and on icy road surfaces. On the other hand, replacing a portion of a relatively high Tg synthetic elastomer such as, for example, emulsion polymerization prepared styrene/butadiene copolymer rubber (E-SBR), with a Tg in a range of about −35° to about −50° C. with natural cis 1,4-polyisoprene rubber having a Tg of about −63° C. would

2 be expected to improve a tire tread's winter performance, such as traction on icy road surfaces, but to reduce the tread's traction on a wet road surface.

Indeed, for those skilled in such art, it is generally considered that by adjusting the elastomer mixture in the tire tread, either wet or winter performance, namely traction on wet road surfaces or traction on icy road surfaces, is generally improved at the expense of the other.

SUMMARY AND PRACTICE OF THE INVENTION

In accordance with this invention, a pneumatic tire is provided having a tread comprised of, based on 100 parts by weight rubber, (A) elastomers composed of (i) about 20 to about 50, alternatively about 30 to about 40 phr of cis 1,4-polyisoprene natural rubber having a Tg in a range of about −60° to about −65° C., (ii) about 50 to about 80, alternatively about 60 to about 70 phr of two synthetic diene-based elastomers consisting essentially of (a) about 20 to about 50, alternatively about 30 to about 40, phr isoprene/butadiene copolymer elastomer having a Tg in a range of about −35° C. to about −50° C. and an isoprene content in a range of about 30 to about 70 weight percent, and (b) about 20 to about 50, alternatively about 20 to about 35, phr of medium cis 1,4-polybutadiene rubber having about 35 to about 55, preferably about 40 to about 50, percent cis 1,4-microstructure, and 7 to about 15 percent vinyl 1,2-content with the remainder being of a trans 1,4-microstructure and having a Tg in a range of about −85° to about −95° C., (B) about 40 to about 100, alternatively about 60 to about 90, phr of particulate reinforcing filler composed of carbon black or carbon black and silica, preferably precipitated silica, with a weight ratio of carbon black to silica in a range of about 1/20 to about 20/1, alternatively about 1/5 to about 5/1, (C) at least one silica coupler for the silica, if silica is used, having a moiety reactive with the surface of said silica and another, sulfur based, moiety interactive with said elastomer.

Typically, the silica coupler has a silane moiety reactive with the surface of the silica such as, for example, SiOH groups thereon, and another, polysulfide based, moiety interactive with the elastomers, typically in a weight ratio of silica to coupler of about 7/1 to about 15/1. For example, the coupler may be a bis-(3-trialkoxysilylalkyl) polysulfide having from 2 to about 8 sulfur atoms in its polysulfidic bridge. Exemplary of such a coupler may be a bis-(3-triethoxysilylpropyl) polysulfide having an average of 3 to 4 sulfur atoms in its polysulfidic bridge.

In one aspect of the invention, the basic three rubber elastomers for the tire tread rubber can also contain about 5 to about 15 phr of one or more additional rubber(s), namely, at least one of high cis 1,4-polybutadiene rubber containing about 94 to about 99 percent cis 1,4-microstructure and having a Tg in a range of about −95° to about −105° C., medium vinyl polybutadiene rubber having about a 35 to about 50 percent vinyl 1,2-content and a Tg in a range of about −40° to about −60° C., high vinyl polybutadiene rubber having about a 55 to about a 70 percent vinyl 1,2-content and a Tg in a range of about −30° to about −40° C., and a high trans polybutadiene rubber having a trans 1,4-content of about 75 to about 95 percent, a vinyl 1,2- content of about 8 to about 15 percent with a Tg in a range of about −70° to about −80° C., so long as the aforesaid basic natural rubber and two synthetic diene-based elastomers are present.

Significantly, the tread rubber composition is required to contain an appreciable content of medium cis 1,4- polybutadiene rubber. Such an elastomer typically has a Tg in a range of about −85° to about −95° C. which is considered herein to be a relatively low Tg.

While the mechanism may not be completely understood, it is believed that the medium cis 1,4-polybutadiene may act to promote winter performance, including traction on an icy road surface for the tire tread when used with the aforesaid isoprene/butadiene rubber and natural rubber.

The tread rubber is also required to contain a significant amount of an isoprene/butadiene copolymer elastomer with a relatively high Tg in a range of about −35° to about −50° C. It is believed that such an isoprene/butadiene copolymer elastomer may act to promote both traction, or braking, of the tread on wet road surfaces, sometimes referred to as "wet performance", and traction, or braking, on icy road surfaces, sometimes referred to as "winter performance" for the tire tread when used with the medium cis 1,4-polybutadiene rubber and the natural rubber.

Further, the tread rubber is also required to contain natural rubber, which typically has a Tg in a range of about −60° to about −65° C. which is considered herein to be a relatively low Tg. It is believed that such the natural rubber may act to promote traction, or braking, on icy road surfaces, sometimes referred to as "winter performance", as well as processing of the rubber composition during its preparation and fabrication of the tire tread, when used with the medium cis 1,4-polybutadiene rubber and the isoprene/butadiene rubber.

As hereinbefore pointed out, a minor amount of high cis 1,4-polybutadiene rubber, medium vinyl polybutadiene rubber, high vinyl polybutadiene rubber and/or high trans 1,4-polybutadiene rubber can be added to the elastomer blend for the tire tread of this invention.

The various polybutadiene rubbers for use in this invention can be prepared by organic solution polymerization processes for 1,3-polybutadiene monomer well known to those having skill in such art.

The use of cis 1,4-polyisoprene natural rubber in tire treads is well known to those having skill in such art.

The organic solution polymerization prepared isoprene/butadiene copolymer elastomer can be suitably prepared by copolymerization of isoprene and 1,3-butadiene in an organic solvent solution in the presence of a suitable catalyst and modifier. A preparation of such isoprene/butadiene copolymer elastomer is well known to those having a skill in such art.

It is understood herein that it is well known to those having skill in the tire tread art to use various blends of elastomers for tire tread compositions. However, it is an important feature of this invention that specific elastomers are used in specified amounts as a basic rubber composition in a substantial absence of other elastomers together with carbon black reinforcing filler or with reinforcing filler composed of both carbon black and silica. It is believed herein that such specified combination of elastomers for use in rubber tire treads is novel and inventive.

One having skill in rubber composition preparation for tire treads would expect that by replacing a high Tg elastomer, such as for example E-SBR having a Tg of about −42° C., in a tire tread blend of elastomers, by a lesser amount of another elastomer having a similar or same Tg, such as for example isoprene/butadiene copolymer elastomer (IBR) having a Tg of about −42° C., together with a small amount of natural cis 1,4-polyisoprene rubber having a Tg of about −63° C., that the wet skid performance of the tire (braking on wet road surfaces) would decrease and the ice grip performance (traction and braking on icy road surfaces) would improve.

However, unexpectedly in the practice of this invention, it has been observed that by replacing 35 phr of emulsion polymerization prepared styrene/butadiene copolymer rubber (E-SBR) having a Tg of about −42° C. (Ex 1 of Example I herein) by 30 phr of isoprene/butadiene copolymer rubber (IBR) having a Tg of about −42° C. and 5 phr of natural cis 1,4-polyisoprene rubber (Test A of Example I herein) wet skid, as well as ice acceleration and ice braking are improved. The above observation was made on carbon black reinforced tread compositions. This observation is considered herein to be unusual because winter and wet performance were improved and the expected reduction in wet performance was not observed. It is considered herein that this can be of a special benefit for tread rubber compositions for winter and all season tires, namely, to enhance driving control on the road for both wet and winter conditions.

It is contemplated herein that the wet performance (traction, or braking) and rolling resistance of the tire could be further improved by replacing part of the carbon black reinforcement with silica plus a silica coupler, as hereinbefore discussed. However, in the practice of this invention, it has been surprisingly observed that, by doing so, the ice braking performance (traction on icy road surface) also improved. This phenomenon was unexpected. It is considered herein that this can be of special benefit in order to enhance braking performance of winter and all season tires on icy road surfaces.

In the practice of this invention, the basic, balanced, rubber blend of natural rubber and two synthetic elastomers, namely the isoprene/butadiene copolymer elastomer and medium cis 1,4-polybutadiene elastomer is provided which relies upon carbon black or upon a combination of carbon black and silica, together with a silica coupler, for rubber reinforcement. The silica, in turn, relies upon use of a silica coupler for the silica's reinforcing effect for the rubber blend.

It is recognized that various elastomer reinforcing carbon blacks can be used in the practice of this invention for the tire tread rubber composition as would be well known to those skilled in such art. For example, relatively high reinforcing carbon blacks are contemplated such as those having an iodine number in a range of about 80 to about 150 and a DBP (dibutyl phthalate) value in a range of about 90 to about 150 as exemplified in *The Vanderbilt Rubber Handbook* (1990), page 417). For example, the N121, N220, N234, N330 and N375 carbon blacks might be contemplated.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

The BET surface area of the silica, as measured using nitrogen gas, may be in a range of about 100 to about 250, preferably about 120 to about 200, square meters per gram ($m^2/g$). The BET method of measuring surface area is described in the *Journal of the American Chemical Society*, Volume 60, page 304 (1930).

The silica also may typically have a dibutylphthalate (DBP) absorption value in a range of about 100 to about 400, and usually about 150 to about 300 ml/100 g.

Various commercially available silicas may be considered for use in this invention such as, for example only and without limitation, silicas commercially available from PPG Industries under the Hi-Sil trademark with designations 210, 243, etc; silicas available from Rhone-Poulenc, with designation of Zeosil 1165MP, silicas available from Degussa AG with designations VN2 and VN3, and BV3370GR and from J. M. Huber as, for example, Zeopol 8745.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to about 5 phr. Typical amounts of fatty acids, if used, which can include stearic acid comprise about 0.5 to about 5 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.5 being sometimes preferred.

Accelerators are used to control the time and/or temperature required for vulcanization and to improve the properties of the vulcanizate. Retarders are also used to control the rate of vulcanization. In one embodiment, a single accelerator system may be used, i.e., primary accelerator. Conventionally and preferably, a primary accelerator(s) is used in total amounts ranging from about 0.5 to about 4, alternatively about 1.2 to about 2.0, phr. In another embodiment, combinations of a primary and secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to the use of the specified blend of natural rubber, isoprene/butadiene elastomer and medium cis 1,4-polybutadiene rubber together with specified reinforcing fillers in specified amounts as carbon black and/or silica in combination with a coupling agent for the silica.

The tire can be built, shaped, molded and cured by various methods which will be readily apparent to those having skill in such art.

The invention may be better understood by reference to the following examples in which the parts and percentages are by weight unless otherwise indicated.

EXAMPLE I

A rubber composition (compounded rubber) was prepared of a blend of cis 1,4-polyisoprene natural rubber, isoprene/butadiene copolymer synthetic elastomer and medium cis 1,4-polybutadiene synthetic rubber which is referred to herein as Tests A, B, C and D.

A control rubber composition was prepared of cis 1,4-polyisoprene natural rubber, emulsion polymerization prepared styrene/butadiene copolymer rubber (E-SBR) with 31% bound styrene and medium cis-1,4-polybutadiene elastomer and is referred to herein as "Example 1 (Ex 1)".

The rubber compositions are prepared by mixing the ingredients in several stages, namely, 2 to 4 sequential internal mixing stages without the curatives (usually referred to as "non-productive mix stages") and a final internal mixing stage for adding the curatives (usually referred to as a "productive mix stage"). Then the resulting composition is molded and cured under conditions of elevated temperature and pressure.

Such mixing of rubber compositions is well known to those having skill in such art.

The rubber compositions are comprised of the ingredients illustrated in Table 1. The amounts of materials are presented in terms of phr, or parts by weight of material per 100 parts by weight of dry rubber.

TABLE 1

| | Non-Productive Mix | | | | |
|---|---|---|---|---|---|
| | Ex 1 | Test A | Test B | Test C | Test D |
| NR[1] | 30 | 35 | 35 | 35 | 35 |
| E-SBR[2] | 40 | | | | |
| IBR[3] | | 35 | 35 | 35 | 35 |
| MC-BR[4] | 30 | 30 | 30 | 30 | 30 |
| Carbon Black[5] | 80 | 80 | 45 | 45 | |
| Silica A[6] | | | 40 | | 85 |
| Silica B[7] | | | | 40 | |
| Coupler[8] | | | 6.4 | 6.4 | 13.4 |
| Total Aromatic Oil[9] | 44.6 | 44.6 | 44 | 44 | 35 |

Conventional amounts of zinc oxide and stearic acid and antidegradants are used in the non-productive mix.

To the non-productive mix is then mixed, in a productive mixing stage, conventional amounts of sulfur and accelerator(s) of the sulfenamide and guanidine type.

1) Cis 1,4-polyisoprene natural rubber.

2) Emulsion polymerization prepared styrene/butadiene copolymer rubber with about 31 percent bound styrene and having a Tg of about −42° C. obtained as Cariflex S5820 from the Shell company and assumed to be a trademark.

3) An isoprene/butadiene copolymer elastomer having an isoprene content of about 50 percent and a Tg of about −42° C. obtainable from The Goodyear Tire & Rubber Company.

4) Medium cis 1,4-polybutadiene rubber having a cis 1,4-content of about 42 percent, vinyl 1,2- content of about 10 percent, trans 1,4-content of about 48 percent and a Tg of about −92° C. obtainable as BUD 1209 from The Goodyear Tire & Rubber Company.

5) An ISAF carbon black (N234).

6) A silica obtainable as Zeosil 1165 MP from the Rhone-Poulenc company.

7) A silica obtainable as VN2 from Degussa.

8) Silica coupler obtainable as bis-3-triethoxysilylpropyl) tetrasulfide (50% active) commercially available as X50S from Degussa as a 50/50 blend of the tetrasulfide with N330 carbon black (thus, considered 50% active). It is reported in Table 1 as the 50/50 mixture.

9) Total oil in the rubber composition including both the oil contained in the elastomers and the added processing oil. The elastomers are reported in the Table based upon their dry weight, although the E-SBR elastomer also contained 37.5 phr of oil.

EXAMPLE II

Tires of size 175.70R13 were prepared with rubber treads of the rubber compositions of Example I, namely Ex 1, Test A, Test B, Test C and Test D and the tires are referred to herein correspondingly referenced to such rubber compositions. The test results for the Ex 1 tire are normalized to 100 and associated test values for the remainder of the test tires are reported herein as compared to such normalized values and shown in Table 2.

TABLE 2

|  | Ex 1 | Test A | Test B | Test C | Test D |
| --- | --- | --- | --- | --- | --- |
| Rolling Resistance | 100 | 100 | 110 | 108 | 118 |
| Wet Skid (braking) | 100 | 104 | 106 | 108 | 110 |
| Ice Acceleration (traction) | 100 | 109 | 107 | 109 | 108 |
| Ice Braking (traction) | 100 | 107 | 108 | 109 | 110 |

Higher values for the above reported test results for each of the rolling resistance, wet skid, ice acceleration and ice braking tests are considered improvements.

These results show that significant improvements in wet and ice performance are observed by utilizing the aforesaid three rubber basic composition, namely, the natural rubber and two specified synthetic butadiene based elastomers, in combination with carbon black or a combination of carbon black and silica filler in place of a more conventional E-SBR/natural rubber/polybutadiene elastomer blends with carbon black reinforcing filler.

In particular, the results of the tests for the Test A tire shows that by replacing the E-SBR (Tg −42° C.) of the Ex-1 rubber composition with a lesser amount of IBR (Tg −42° C.) together with a small amount of natural rubber (Tg −63° C.) that the wet skid, ice acceleration and ice braking values were observed to be improved while the rolling resistance values were basically equivalent. This is considered herein to be significant because it was expected that a reduction in wet skid performance would be observed with the improvement in winter performance. Therefore, the improvement in wet skid performance was contrary to expectations.

Further, the results of the tests for the Test B and C tire shows that by replacing a part of the carbon black with silica, together with a silica coupler, in the Test A rubber composition for the tire tread, that the rolling resistance and wet skid was observed to be improved, as expected and, unexpectedly, the ice braking performance was also improved.

Additionally, the results of the tests for the Test C tire shows that by using an alternative silica, namely a lower BET surface area silica instead of the silica used for the Test B rubber composition for the tire tread, lower rolling resistance but better wet braking and ice performance properties for the tire were observed. This is considered herein to be significant because it indicates that a rather broad range of precipitated silicas might be used in the practice of this invention, but that by the choice of silica type, the balance of desired properties might be tuned, or optimized for a particular purpose or desired tire tread properties.

The results of the tests for the Test D tire shows that by replacing more of the carbon black with the silica used for Test B composition for the tire tread, the rolling resistance, wet braking and ice braking performances were observed to be improved as compared to the Test B tire and particularly in view of the Ex 1 tire. This is considered herein to be significant because additional vehicular fuel economy and driving safety may, thus, be enhanced.

Accordingly, it can be concluded that, in the practice of this invention, vehicular driving safety on both wet and wintery roads may be significantly enhanced and that enhanced fuel economy may also be a factor when providing a tire with a tread composed of a rubber composition of the invention's required natural rubber and two defined polybutadiene based elastomers. It can further be concluded that such tread rubber can have as reinforcement fillers either carbon black reinforcement or a combination of carbon black and silica.

Wet skid is a measurement of braking distance of the car on wet surfaces. Ice braking is a measurement of braking distance on a natural or artificial ice surface. Thus, they are types of traction measurements.

The ice acceleration is a measurement of time to accelerate from a given vehicular speed A to a given speed B on a natural or artificial ice surface. Thus, it is a type of traction.

The rolling resistance was determined by ISO method 8767. A higher reported value for the rolling resistance means a lower, or improved, rolling resistance which may translate into better fuel economy for the vehicle. A higher value is preferred and represents lower rolling resistance.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread comprised of, based on 100 parts by weight rubber, (A) elastomers composed of (i) about 20 to about 50 phr of cis 1,4-polyisoprene natural rubber, (ii) about 50 to about 80 phr of two synthetic diene-based elastomers consisting essentially of (a) about 20 to about 50 phr isoprene/butadiene copolymer elastomer having a Tg in a range of about −35° C. to about −50° C. and an isoprene content in a range of about 30 to about 70 weight percent, and (b) about 20 to about 50 phr of medium cis 1,4-polybutadiene rubber having about 35 to about 55 percent cis 1,4-microstructure, and 7 to about 15 percent vinyl 1,2- content with the remainder being of a trans 1,4- microstructure and a Tg in a range of about −85° to about −95° C., (B) about 40 to about 100 phr of particulate reinforcing filler composed of carbon black, or composed of a combination of carbon black and silica with a weight ratio of carbon black to silica in a range of about 20/1 to about 1/20, and (C) at least one silica coupler for the silica, if silica is used, having a moiety reactive with the surface of said silica and another, sulfur based, moiety interactive with said elastomer.

2. The tire of claim 1 wherein the reinforcing filler is carbon black.

3. The tire of claim 2 wherein the carbon black is characterized by having an iodine number in a range of about 80 to about 150 and a DBP value in a range of about 90 to about 150 g/100 ml.

4. The tire of claim 1 wherein the reinforcing filler is a combination of carbon black and silica, wherein the weight ratio of silica to silica coupler is in a range of about 7/1 to about 15/1 and where said silica is characterized by having a BET surface area in a range of about 100 to about 250 m²/g and a DBP absorption value in a range of about 100 to about 400 v g/100 ml.

5. The tire of claim 4 wherein the weight ratio of carbon black to silica is in a range of about 5/1 to 1/5.

6. The tire of claim 4 where the silica coupler has a silane moiety reactive with the surface of the silica and another, polysulfide based, moiety interactive with the elastomers.

7. The tire of claim 4 where the said silica coupler is a bis-(3-trialkoxysilylalkyl) polysulfide having from 2 to about 8 sulfur atoms in its polysulfidic bridge.

8. The tire of claim 4 where the said silica coupler is a bis-(3-triethoxysilylpropyl) polysulfide having an average of 3 to 4 sulfur atoms in its polysulfidic bridge.

9. The tire of claim 1 where said tread also contains about 5 to about 15 phr of an additional rubber as at least one of high cis 1,4-polybutadiene rubber having about 94 to about 99 percent cis 1,4-microstructure and a Tg in a range of about −95° to about −105° C., medium vinyl polybutadiene rubber having about 35 to about 50 percent vinyl 1,2- groups, a Tg in a range of about −40° to about −60° C., high vinyl polybutadiene rubber having about 55 to about 70 percent vinyl 1,2- groups and a Tg in a range of about −30° to about −40° C. and high trans 1,4-polybutadiene rubber having a trans 1,4- content of about 75 to about 95 percent, a vinyl 1,2- content of about 8 to about 15 percent and a Tg in a range of about −70° to about −80° C.

10. The tire of claim 9 where said additional rubber is high cis 1,4-polybutadiene rubber.

11. The tire of claim 9 where said additional rubber is said medium vinyl polybutadiene rubber.

12. The tire of claim 9 where said additional rubber is said high vinyl polybutadiene rubber.

13. The tire of claim 9 where said additional rubber is said high trans 1,4-polybutadiene rubber.

14. The tire of claim 2 where said tread also contains about 5 to about 15 phr of an additional rubber as at least one of high cis 1,4-polybutadiene rubber having about 94 to about 99 percent cis 1,4-microstructure and a Tg in a range of about −95° to about −105° C., medium vinyl polybutadiene rubber having about 35 to about 50 percent vinyl 1,2- groups and a Tg in a range of about −40° to about −60° C., high vinyl polybutadiene rubber having about 55 to about 70 percent vinyl 1,2- groups and a Tg in a range of about −30° to about −40° C. and high trans 1,4-polybutadiene rubber having a trans 1,4- content of about 75 to about 95 percent, a vinyl 1,2- content of about 8 to about 15 percent and a Tg in a range of about −70° to about −80° C.

15. The tire of claim 14 where said additional rubber is high cis 1,4-polybutadiene rubber.

16. The tire of claim 14 where said additional rubber is medium vinyl polybutadiene rubber.

17. The tire of claim 14 where said additional rubber is high vinyl polybutadiene rubber.

18. The tire of claim 14 where said additional rubber is said high trans 1,4-polybutadiene rubber.

19. The tire of claim 14 where said tread also contains about 5 to about 15 phr of an additional rubber as at least one of high cis 1,4-polybutadiene rubber having about 94 to about 99 percent cis 1,4-microstructure and a Tg in a range of about −95° to about −105° C., medium vinyl polybutadiene rubber having about 35 to about 50 percent vinyl 1,2- groups, a Tg in a range of about −40° to about −60° C., high vinyl polybutadiene rubber having about 55 to about 70 percent vinyl 1,2- groups and a Tg in a range of about −30° to about −40° C. and high trans 1,4-polybutadiene rubber having a trans 1,4- content of about 75 to about 95 percent, a vinyl 1,2- content of about 8 to about 15 percent and a Tg in a range of about −70° to about −80° C.

20. The tire of claim 4 where said tread also contains about 5 to about 15 phr of an additional rubber as at least one of high cis 1,4-polybutadiene rubber having about 94 to about 99 percent cis 1,4-microstructure and a Tg in a range of about −95° to about −105° C., medium vinyl polybutadiene rubber having about 35 to about 50 percent vinyl 1,2- groups and a Tg in a range of about −40° to about −60° C., high vinyl polybutadiene rubber having about 55 to about 70 percent vinyl 1,2- groups and a Tg in a range of about −30° to about −40° C. and high trans 1,4-polybutadiene rubber having a trans 1,4- content of about 75 to about 95 percent, a vinyl 1,2- content of about 8 to about 15 percent and a Tg in a range of about −70° to about −80° C.

21. The tire of claim 20 where said additional rubber is high cis 1,4-polybutadiene rubber.

22. The tire of claim 20 where said additional rubber is said medium vinyl polybutadiene rubber.

23. The tire of claim 20 where said additional rubber is said high vinyl polybutadiene rubber.

24. The tire of claim 20 where said additional rubber is said high trans 1,4-polybutadiene rubber.

25. A pneumatic tire of having a tread comprised of, based on 100 parts by weight rubber, (A) elastomers composed of (i) about 30 to about 40 phr of cis 1,4-polyisoprene natural rubber having a Tg in a range of about −60° to about −65° C., (ii) about 60 to about 70 phr of two synthetic diene-based elastomers consisting essentially of (a) about 30 to about 40 phr isoprene/butadiene copolymer elastomer having a Tg in a range of about −35° C. to about −50° C. and an isoprene content in a range of about 30 to about 70 weight percent, and (b) about 20 to about 35 phr of medium cis 1,4-polybutadiene rubber having about 35 to about 55 percent cis 1,4- microstructure, and 7 to about 15 percent vinyl 1,2- content with the remainder being of a trans 1,4- microstructure and a Tg in a range of about −85° to about −95° C., (B) about 40 to about 100 phr of particulate reinforcing filler composed of carbon black or carbon black and silica with a weight ratio of carbon black to silica in a range of about 20/1 to about 1/20 and (C) at least one silica coupler for the silica, if silica is used, having a moiety reactive with the surface of said silica and another, sulfur based, moiety interactive with said elastomer.

26. The tire of claim 25 where said filler is carbon black in an amount of about 40 to about 90 phr.

27. The tire of claim 25 where said filler is a combination of carbon black and silica in an amount of about 40 to about 90 phr and where the ratio of silica to coupler is about 7/1 to about 15/1.

28. The tire of claim 27 where said coupler is a bis-(3-trialkoxysilylalkyl) polysulfide having from 2 to about 8 sulfur atoms in its polysulfidic bridge.

29. The tire of claim 25 where said tread also contains about 5 to about 15 phr of an additional rubber as at least one of high cis 1,4-polybutadiene rubber having about 94 to about 99 percent cis 1,4-microstructure and a Tg in a range of about −95° to about −105° C., medium vinyl polybutadiene rubber having about 35 to about 50 percent vinyl 1,2- groups and a Tg in a range of about −40° to about −60° C., high vinyl polybutadiene rubber having about 55 to about 70 percent vinyl 1,2- groups and a Tg in a range of about −30° to about −40° C. and high trans 1,4-polybutadiene rubber having a trans 1,4- content of about 75 to about 95 percent, a vinyl 1,2- content of about 8 to about 15 percent and a Tg in a range of about −70° to about −80° C.

30. The tire of claim 29 wherein said additional rubber is said high cis 1,4-polybutadiene rubber.

31. The tire of claim 30 wherein said additional rubber is said high vinyl polybutadiene.

32. The tire of claim 30 where said additional rubber is said medium vinyl polybutadiene.

33. The tire of claim 30 where said additional rubber is said high trans 1,4-polybutadiene rubber.

* * * * *